W. A. CROWDUS.
STORAGE BATTERY.
APPLICATION FILED MAR. 7, 1914.
1,155,047.
Patented Sept. 28, 1915.
2 SHEETS—SHEET 1.
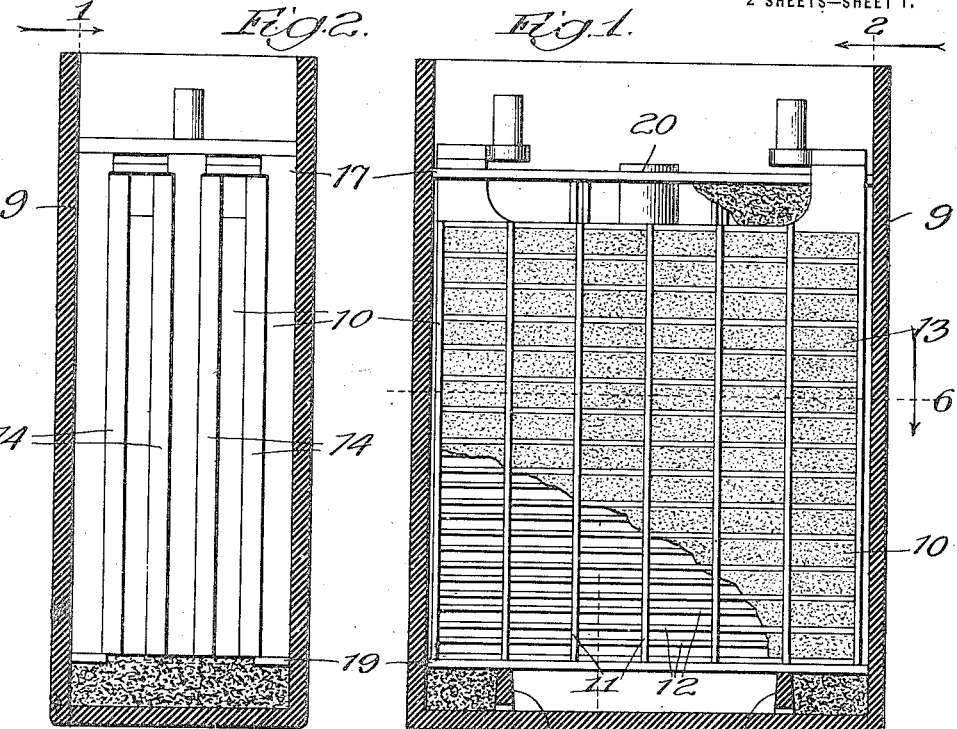
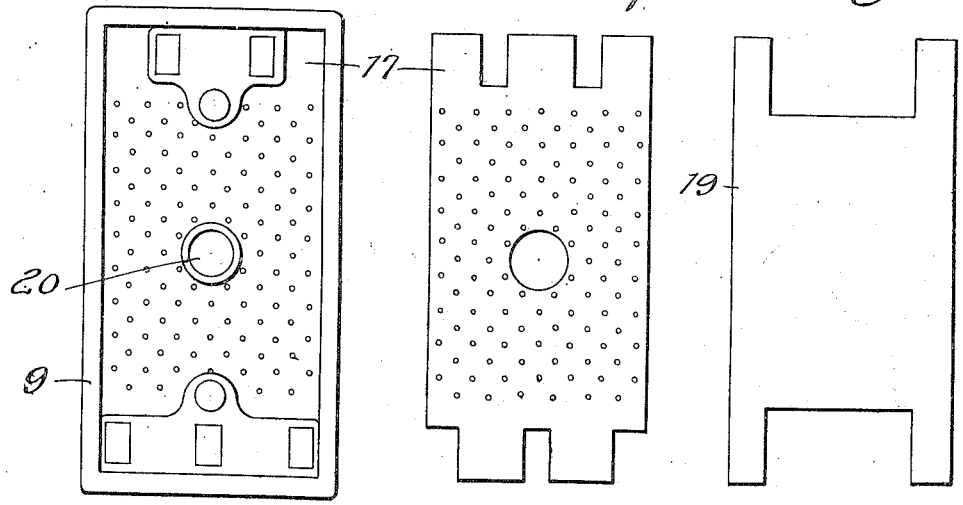
Witnesses:
Inventor:
Walter A. Crowdus,
By Dyrenforth, Lee, Chritton & Wiles,
Attys.

W. A. CROWDUS.
STORAGE BATTERY.
APPLICATION FILED MAR. 7, 1914.
1,155,047.
Patented Sept. 28, 1915.
2 SHEETS—SHEET 2.
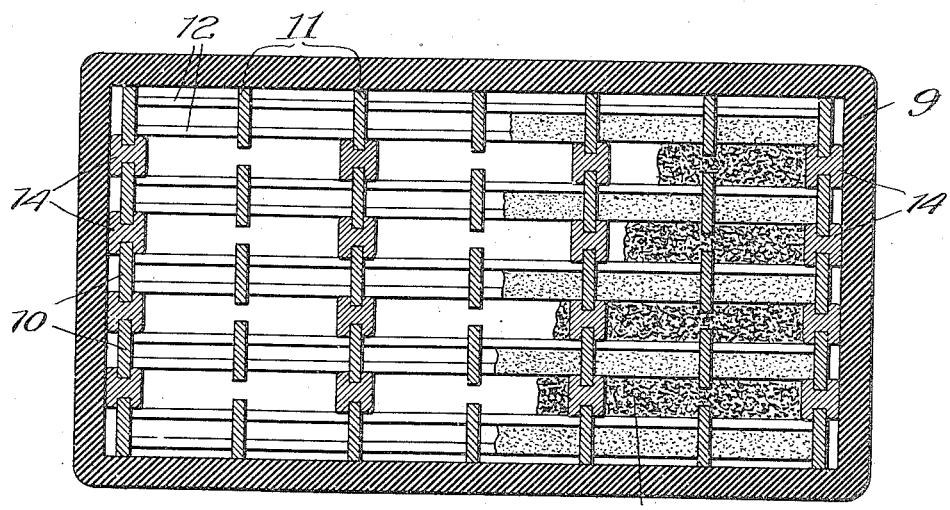
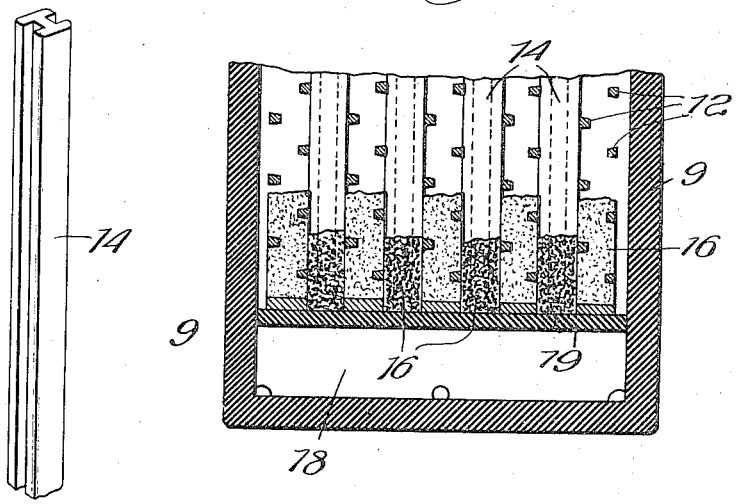
Witnesses:
Inventor:
Walter A. Crowdus,

UNITED STATES PATENT OFFICE.

WALTER A. CROWDUS, OF CHICAGO, ILLINOIS, ASSIGNOR OF ONE-HALF TO ATKINSON, MENTZER & COMPANY, OF CHICAGO, ILLINOIS, A CORPORATION OF ILLINOIS.

STORAGE BATTERY.

1,155,047.  Specification of Letters Patent.  Patented Sept. 28, 1915.

Application filed March 7, 1914. Serial No. 823,128.

*To all whom it may concern:*

Be it known that I, WALTER A. CROWDUS, a citizen of the United States, residing at Chicago, in the county of Cook and State of Illinois, have invented a new and useful Improvement in Storage Batteries, of which the following is a specification.

My invention relates to an improvement in the class of storage or secondary batteries in which the liquid electrolyte is rendered afluidic, or non-flowing, by holding it absorbed, or in suspension, in a paste or jelly, which is known in the art as dry, jelly, or solid electrolyte. The advantages sought to be attained by this type of battery, but which are only very imperfectly attained thereby, are those of providing a free circulation of the electrolyte in a non-spilling condition in an absorbent between the battery-elements, and preventing washing away and loss of active material and resultant diminution of the capacity of the cell. By my improvement, these and other advantages are perfectly attained.

In the accompanying drawings, Figure 1 is a section of my improved storage-battery on line 1, Fig. 2, showing part of one grid unfilled with active material, or material to be rendered active, and some of the absorbent filler; Fig. 2 is a section on line 2, Fig. 1; Fig. 3 is a top plan view of the battery; Fig. 4 is a plan view of the upper perforated covering-plate, and Fig. 5 is a similar view of the bottom plate; Fig. 6 is an enlarged section on line 6, Fig. 1; Fig. 7 is a similar, but broken section on line 7, Fig. 1, and Fig. 8 is a broken perspective view of one of the similar spacers used for locking the grids in their spaced relation.

The jar 9 is made of any suitable material (usually hard rubber). The preferred construction of the grid 10, which may best be made of lead or an alloy of lead and antimony, comprises a frame having its upper members connected by vertical bars 11 of the same width as the side-members of the frame, which are connected by cross-bars 12 extending from points between their edges to leave the edge-portions as projections; and these cross-bars intersect the bars 11 at points, corresponding with those at which they extend from the side-members, to leave the edge-portions of the vertical bars also as projections. These cross-bars, which extend at intervals along the opposite faces of the grid, are preferably staggered, as most clearly shown in Fig. 7, and form pockets for confining the active material, or material to be rendered active, 13.

The transfusion needed during the discharge to restore the weakened acid next the material 13 on the grids, requires, as I have found, a cellular or granular structure of absorbent filler, which is the equivalent of a coarse filter of large capacity; and this transfusion, as I have also found, can not take place with the required rapidity through jelly-like or paste-like fillers, or even through coarse sand, pumice, tripoli, and like substances which have been proposed.

For my present improvement I use as the preferred material for the absorbent filler, a selected wood ground and screened to a size, and which is rendered more suitable for the purpose by treating it chemically to so alter its organic composition, by removing its contained acids and gums, as to render it resistant to injury from the acid in the electrolyte, which is a solution of any usual or desired composition. This material when dried has the property, as a filler in the battery as hereinafter described, of absorbing and holding more than 90 per cent. of the total solution-capacity of the liquid electrolyte, and that of maintaining the same voltage-curve and capacity even on heavy discharges, thus greatly prolonging the life of the battery. For confining this filler between the battery-grids provided with the material 13, the grids are stably held apart in suitably spaced relation and insulated from each other by means of spacing bars 14 of general I-beam shape and made of insulating material, such as hard rubber. By interposing these bars between the adjacent projecting edges of coincident vertical bars 11 on adjacent grids, these projections enter the grooves in the opposite sides of the bars, which not only space the grids apart but hold them interlocked, and therefore stably, in their spaced relation. The space between each pair of grids is thus divided by the bars 14 into separated sections; and I introduce my granulated absorbent filler 16 into these spaces in a dry and shrunken condition and in quantity sufficient to completely fill them and extend to some height over the upper edges of the grids. I then cover the grids with a perforated sheet 17 of insulating material, such as hard rubber, which fits within the mouth of the jar to prevent displacement of the filler. When the electrolyte solution is poured into the cell, it is quickly absorbed by the filler, slightly swelling the latter and causing it to expand into close and cushioning contact with the opposing grid-surfaces and material 13 thereon and prevent washing, loosening and dislodgment of the latter, thereby prolonging the capacity and life of the battery-elements.

While my absorbent filler carries an exceptionally great amount of the electrolyte solution, it nevertheless requires, the same as does an ordinary wet battery, replenishing at intervals with water. To avoid the consequence of neglecting the replenishment, when needed, I use the space in the bottom of the jar, containing the usual mud-bridges 18 (Fig. 1), upon which the grids seat, as a reservoir for holding a surplus of the solution to be drawn up by capillary attraction into the body of the filler, for this purpose providing a union with the filler by packing a quantity thereof in the spaces between the bridges 18 and the jar-walls, which communicate with the reservoir through openings in the bases of the bridges, as shown in Fig. 1. To separate the body of the filler from this reservoir-space, an imperforate sheet 19 of hard rubber, or other suitable insulating material, is interposed, which covers only the space between the mud-bridges. The capillary action, referred to, takes place whenever the quantity of solution in the body of the filler falls below that required for saturating it.

I also provide a "tell-tale" well, or indicating tube 20, to extend from the top of the filler centrally through the upper covering-plate 17. When the battery is being charged and reaches the gassing stage, the volume of the solution increases, the same as it does in ordinary wet batteries. Under perfect conditions, when gassing while charging, some free electrolyte-solution should show in the well; and this may be conveniently withdrawn, at any time, for use in testing the specific gravity of the electrolyte. As the filler, which is highly capillary, gets below the point of saturation, it will absorb any free liquid in the lower reservoir to the point of saturation. The tell-tale well 20 serves to indicate the condition of the supply of liquid electrolyte in the lower reservoir and, indirectly, in the absorbing filler; and whenever the well is found to be empty, that condition shows that the battery needs replenishing with water.

My improved battery has, under discharge, all the characteristics of the circulating liquid-electrolyte type, with the advantage that the solution is rendered non-spilling and that of giving longer service by reason of the absorbent filler preventing the loss of active material from the grids; and, besides, since the solution is, in a measure, confined in the absorbent filler, it sprays less, under charge, than in the cells where the liquid electrolyte is free, so that the loss of water from gassing is less.

My absorbent filler, moreover, is much superior to pastes or jellies, as heretofore used in the art, because they are injuriously affected by acids and oxidants in the cell, are insufficiently porous to permit the necessary circulation through them, and are so high in resistance and in their content of inert solid matter, as to produce heating effects resulting in destructive drying and shrinking of the mass, with rapid falling off in capacity and early total uselessness.

What I claim as new and desire to secure by Letters Patent is—

1. In a storage-battery of the character described, grids carrying the active material, or material to be rendered active, insulating grooved bars spacing the grids apart and interlocking them in their spaced relation, a filler of ground wood, substantially devoid of gums and acids, in the spaces between grids, and a liquid electrolyte absorbed in said filler and operating to swell the latter and tighten it in the spaces against the grid-surfaces to lock said material against dislodgment.

2. In a storage-battery of the character described, grids carrying the active material, or material to be rendered active, and having vertical ribs projecting on the opposing grid-faces, and grooved insulating bars into the grooves of which the opposite ribs extend to space the grids apart and interlock them in their spaced relation.

3. In a storage-battery of the character described, grids carrying the active material, or material to be rendered active, and having vertical ribs projecting on the opposing grid-faces, insulating bars of general I-beam shape into the grooves of which the opposite ribs extend to space the grids apart and interlock them in their spaced relation, said bars dividing the spaces between grids into sections, and a filler of coarsely-ground wood, substantially devoid of gums and acids, in said sections.

4. In a storage-battery of the character described, a jar having perforated mud-bridges in its bottom forming a reservoir, grids carrying the active material, or material to be rendered active, seating on said bridges, a plate of insulating material covering said reservoir, absorbent filler in the spaces between grids, and a similar filler at the outer sides of said bridges having capillary union with the filler above it in said spaces.

WALTER A. CROWDUS.

In presence of—
A. C. FISCHER,
O. C. AVISUS.